US008847452B1

(12) United States Patent
Belanger

(10) Patent No.: US 8,847,452 B1
(45) Date of Patent: Sep. 30, 2014

(54) ELECTRIC GENERATOR WITH ROTATING INDUCTION APPARATUS AND CENTRIPETAL MOTION OPERATION

(76) Inventor: Douglas James Belanger, San Jose, CA (US)

( * ) Notice: Subject to any disclaimer, the term of this patent is extended or adjusted under 35 U.S.C. 154(b) by 406 days.

(21) Appl. No.: 13/135,738

(22) Filed: Jul. 14, 2011

Related U.S. Application Data

(60) Provisional application No. 61/399,901, filed on Jul. 20, 2010.

(51) Int. Cl.
*H02K 21/00* (2006.01)

(52) U.S. Cl.
USPC .......................................................... 310/152

(58) Field of Classification Search
USPC ...................................... 310/20, 80, 112, 152
See application file for complete search history.

(56) References Cited

U.S. PATENT DOCUMENTS

| | | | |
|---|---|---|---|
| 3,992,132 A * | 11/1976 | Putt ................................ | 417/271 |
| 5,184,040 A * | 2/1993 | Lim ................................ | 310/114 |
| 5,982,074 A * | 11/1999 | Smith et al. ................. | 310/254.1 |
| 6,624,542 B1 * | 9/2003 | Gabrys et al. ................... | 310/54 |
| 6,808,288 B2 | 10/2004 | Mah | |
| 7,081,696 B2 * | 7/2006 | Ritchey .......................... | 310/114 |
| 7,151,332 B2 * | 12/2006 | Kundel ........................... | 310/20 |
| 7,911,096 B2 * | 3/2011 | Froelich ......................... | 310/80 |
| 8,519,575 B2 * | 8/2013 | Hunter et al. .................. | 310/20 |
| 2006/0033392 A1 * | 2/2006 | Ritchey ......................... | 310/112 |
| 2012/0086293 A1 * | 4/2012 | Casas ............................. | 310/80 |

* cited by examiner

*Primary Examiner* — Hanh Nguyen

(57) ABSTRACT

The electric generator with rotating induction apparatus and centripetal motion operation locates all of the electromagnetic induction components on the rotating portion of the generator. This design removes the divided electromagnetic interaction of rotating and stationary elements. The rotating input shaft and connected rotor contain the elements experiencing any potential magnetic interaction. There are no magnetic or induction components located on the stationary portion of the generator. A magnetic field source contained within a rotor mounted pivoting housing is moved by centripetal motion through an inductor section of the housing to create electrical induction. The relative angle of rotation of a pivoting inductor assembly is alternately articulated by front and rear guides located within the main housing. The centripetal motion providing magnet movement is created during rotation of the input shaft. This new electric generator is designed to reduce motion source energy necessary to rotate the input shaft and rotor.

18 Claims, 5 Drawing Sheets

ELECTRIC GENERATOR WITH ROTATING INDUCTION APPARATUS AND CENTRIPETAL MOTION OPERATION

RELATED APPLICATIONS

The present application is a continuation application of U.S. provisional patent application Ser. No. 61/399,901, filed Jul. 20, 2010, for ELECTRIC GENERATOR WITH ROTATING INDUCTION APPARATUS AND CENTRIPETAL MOTION OPERATION, by Douglas J. Belanger, included by reference herein and for which benefit of the priority date is hereby claimed.

The present application is related to U.S. Pat. No. 6,808,288 B2, issued Oct. 26, 2004, for FARADAY FLASHLIGHT, by Pat Y. Mah, included by reference herein.

FIELD OF THE INVENTION

The present invention relates to electricity and, more particularly, to electricity generation.

BACKGROUND OF THE INVENTION

The induction of electricity by appropriate and relative motion between magnetic flux and a conductor was demonstrated by Michael Faraday and Joseph Henry in 1831. Faraday's experiments during October of that year discovered that a translating or moving magnet through a coiled loop of wire created electric current in an attached circuit. He called this newly discovered phenomenon between changing magnetism and an induction circuit "electromagnetic induction". He also proposed the idea of "lines of magnetic force" to help explain the process of induction. His discoveries, along with the experiments of other early electricity researchers, provided the basis for many electrical machinery designs that followed.

Since the early days of electrical machinery invention, electric generators have been designed with the magnetic and induction components divided between rotating or rotor and stationary or stator sections of the machine. This traditional arrangement is used to create the required relative motion between the magnetic and induction components of the generator that is needed to create electromagnetic induction. However, this design also creates an unwanted magnetically induced motor reaction force resistance to input shaft rotation caused by magnetic interaction between the rotating and stationary elements of the generator.

The magnetic field or flux created during the electrical induction process opposes the change in magnetic field creating the induction and is known by Lenz's Law. This magnetic field condition within present generator design is created when an inductor creates an electric current, with the associated magnetic field, as a reaction to a changing magnetic field that is in relatively close proximity and in the proper orientation. This process inside the generator can create a situation that opposes rotation of the input shaft during electrical induction through magnetic resistance between the rotor and stator sections. This resistance to input shaft rotation is experienced by the source of rotational movement or "prime mover". The prime mover needs to provide enough energy to rotate the mass of the generator's rotating components, to overcome any friction and air drag present in the machine, and to also overcome the electromagnetic opposition to rotation. More mechanical energy input needs to be applied to the rotating portion of a traditional generator as electrical load in a connected external circuit is increased.

A new generator design is needed to remove this unwanted resistance to input shaft rotation that is inherent in present generator design. Removing the unwanted motor reaction force from a generator's mechanical energy requirements allows for reduced motion source energy needed for the production of electricity.

SUMMARY OF THE INVENTION

The electrical generator with rotating induction apparatus and centripetal motion operation locates all of the electromagnetic induction components on the rotating portion of the generator. This new design removes the divided electromagnetic induction interaction of rotating and stationary elements. This is achieved by not dividing the components necessary for electricity production between a rotor and a stator. The input shaft and connected rotor contain the elements experiencing any potential magnetic interaction that may be present within the machine. There are no magnetic or induction components located on the stationary portion of the generator.

A magnetic field or flux source contained within a rotor mounted pivoting magnet inductor housing, is moved by centripetal motion through the induction section of the housing to create electricity. The centripetal motion providing magnetic flux source movement is created during rotation of the input shaft. The relative angle of rotation of a pivoting magnet-inductor housing, compared to the input shaft rotation axis, is alternately articulated by front and rear guides located within the main housing. The only direct connection between magnetic flux source movement and input shaft rotation is in creating a circular path around the center axis. Magnet flux source movement through the inductor to an area with larger radius is allowed by a low friction condition within the pivoting magnet-inductor housing and by a change in contact surface angle. These changes to forces that are maintaining magnetic flux source circular motion allows the magnetic flux source to move away from a nearer input shaft rotation location to a position on a larger radius. This larger radius is located further away from the center of rotation. This action occurs while the electrical induction elements are maintaining circular motion around the center axis. The rotor mounted pivoting magnet-inductor housing circuit is connected to an external circuit with the use of a rotating circuit connection and a stationary circuit connection.

This new electric generator is designed to reduce prime mover energy necessary to rotate the input shaft and rotor during electromagnetic induction. This reduction in motion source effort is achieved by removing rotor and stator magnetic opposition to rotation during any load condition. The size of the generator, the electrical output, number and configuration of inductors and rotors, the speed of rotation, and the magnetic field strength may be scaled and configured to meet design requirements. Electricity is created with input shaft motion in either clockwise or counter-clockwise direction.

DRAWINGS

Reference Numerals 10 input shaft
12 rotor
14 pivoting magnet-inductor housing
16 magnetic field source
18 end cap
20 main housing 22 front input shaft support
24 rear input shaft support
26 front guide
28 rear guide
30 rotating circuit connection
32 stationary circuit connection
34 rotating wiring
36 stationary wiring
38 pivoting inductor assembly

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Component Descriptions and Interactions

Figure 1:
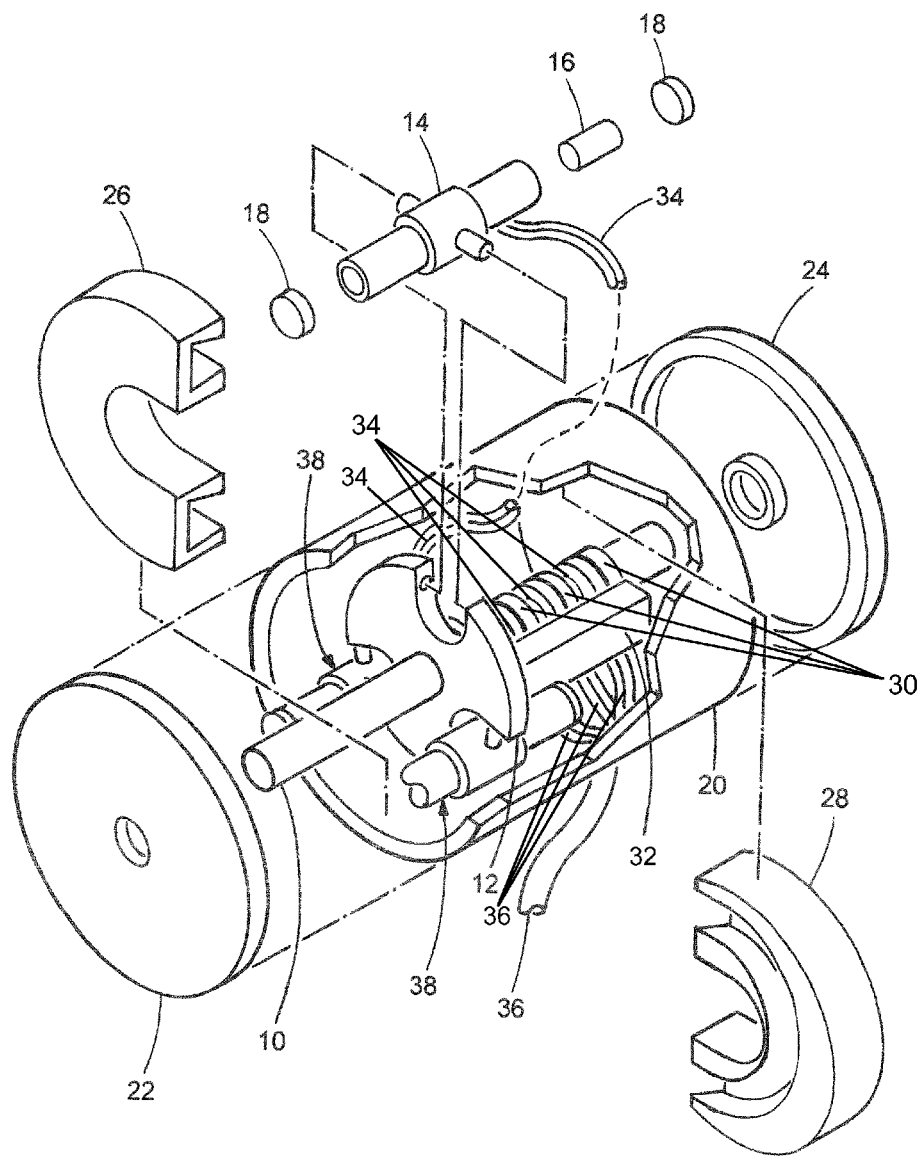
FIG. 1 is an exploded isometric view of an assembly required to create the generator as described in this document along with showing the relationships between the components and the locations needed for operation.

A magnetic field source 16 of appropriate shape and flux strength is inserted into a pivoting magnet-inductor housing 14 of compatible form and sufficient length as shown in FIG. 1. The pivoting magnet-inductor housing 14 provides a pivoting mechanism for rotor 12 mounting and a path for magnetic field source 16 movement. The pivoting magnet-inductor housing 14 also provides a location for an inductor of appropriate structure, such as a coiled loop of wire, which may be located at mid-point along the housing with proper pole orientation relative to the magnetic field source 16. An end cap 18 is secured onto one end of the pivoting magnet-inductor housing 14. Another end cap 18 is secured onto the other end of the pivoting magnet-inductor housing 14 to create a pivoting inductor assembly 38.

The pivoting inductor assembly 38 is attached to a rotor 12 which is of sufficient diameter to reduce the possibility of magnetic interaction with other generator components. Two additional pivoting inductor assembly 38 are created and attached to the remaining rotor 12 locations all of which may be spaced at 120 degree positions around the rotor 12 circumference. The pivoting inductor assembly 38 attachment is of sufficient strength to tolerate circular motion while allowing pivoting motion relative to the rotor 12. This pivoting inductor assembly 38 arrangement will create the design shown in FIG. 1 which can be configured into three individual circuits for three phase electric power.

Rotor 12 is mounted onto an input shaft 10 which is of sufficient diameter and appropriate length. A Rotating circuit connection 30 is positioned onto the input shaft 10 in a practical location along the shaft length. The necessary electrical connections of the rotating wiring 34 are made from the pivoting inductor assembly 38 to the previously mounted rotating circuit connection 30 in the appropriate electrical configurations. Construction is repeated for all rotor 12 mounted pivoting inductor assemblies configured and includes the appropriate number of rotating circuit connection 30 and stationary circuit connection 32 elements required for the alternating current or AC circuits created.

A rear guide 28 is installed in the main housing 20 which is of sufficient diameter to enclose the rotor 12 components. The rear guide 28 has the required features for pivoting inductor assembly 38 tip articulation, and also has the necessary clearance for pivoting inductor assembly 38 movement. A Stationary circuit connection 32 is mounted in the main housing 20 in the appropriate location to correspond with the input shaft 10 mounted rotating circuit connection 30 when the input shaft 10 is installed. The stationary wiring 36 connections may be fed through an appropriately located and protected feed-through in the main housing 20. Alternately, the stationary wiring 36 connections may be routed through an equivalent opening in the rear input shaft support 24 or the front input shaft support 22.

A rear input shaft support 24 of compatible diameter and form to the main housing 20 is properly positioned and secured to the rear circular opening of the main housing 20. The input shaft 10 is inserted through the main housing 20 and then the end of the shaft is inserted into an appropriately designed bearing or bushing-type surface receiving location in the rear input shaft support 24. The correspondingly located rear tip of a pivoting inductor assembly 38 is positioned in the receiving articulation groove in the rear guide 28 as it is installed in the main housing 20.

Figure 2:
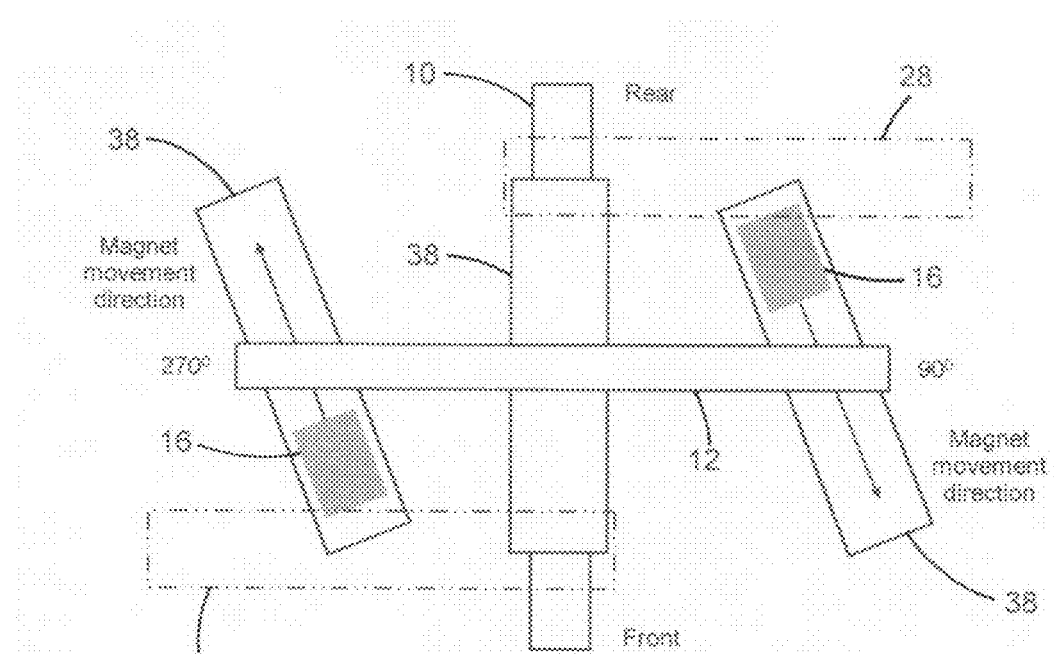
FIG. 2 is a top view of a generator showing the direction of motion for an individual magnet within a pivoting inductor assembly and the angle of the assembly relative to the input shaft at various circular positions during rotor movement.
Figure 3:
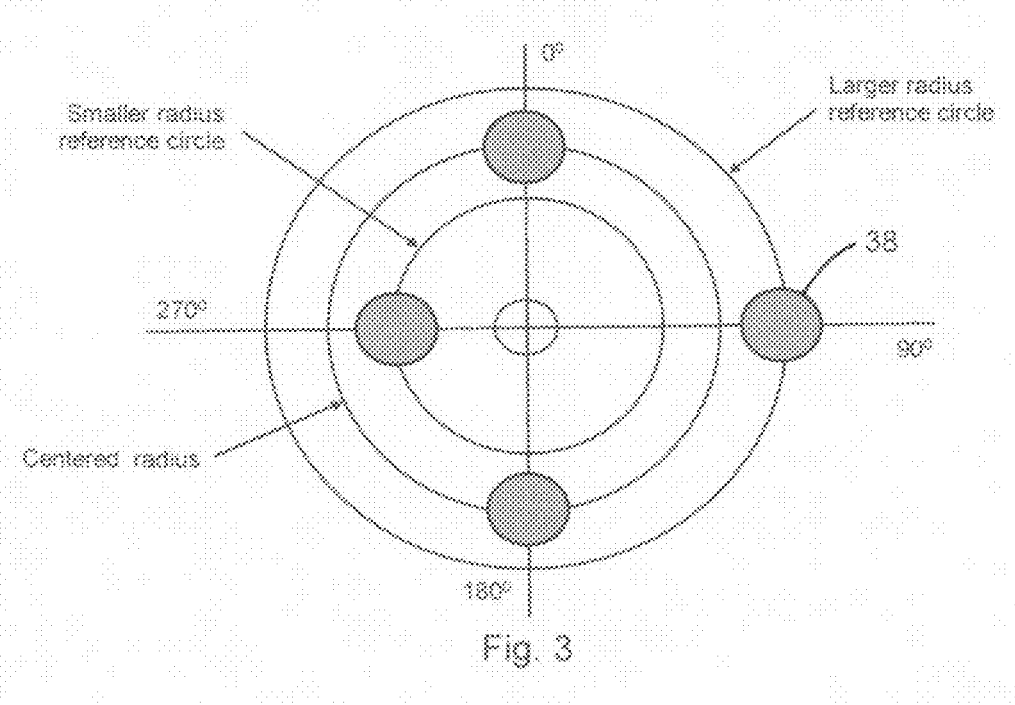
FIG. 3 is a front view of an apparatus showing an individual pivoting inductor assembly front tip at various positions relative to the various circular motion reference circles during one rotation cycle.

A front guide 26 is then installed in the main housing 20 in the location shown in FIG. 1 and FIG. 2 while locating the correspondingly positioned front tip of a pivoting inductor assembly 38 in the associated articulation groove. The front and rear tips of a pivoting inductor assembly 38 are only able to be in the articulation grooves of the front guide 26 and the rear guide 28 at the same time when they are perpendicular to the rotor 12 in a neutral or non-pivoting position. This neutral position is located along the centered pivoting position reference circle as shown in FIG. 3 and is an area of front and rear guide 28 articulation groove overlap.

The exposed front end of input shaft 10 is inserted through an appropriately designed bearing or bushing-type surface opening in a front input shaft support 22 of compatible diameter and form to the main housing 20. The front input shaft support 22 is then properly positioned and secured on the open circular end of the main housing 20. The stationary wiring 36 is connected to an external load circuit as required. The exposed input shaft 10 end may be connected to a rotational motion input source using appropriate mechanisms and attachments. Appropriate material selection and location are important to prevent unwanted magnetic interactions between the magnetic field source 16 and other generator components. This generator design may be built using readily available materials and construction methods.

Method of Operation

The Electric Generator with Rotating Induction Apparatus and Centripetal Motion Operation described in this document works by using a rotor 12 and a pivoting magnet-inductor housing 14 circular motion to move a magnetic field source 16 from end-to-end through an induction circuit. The magnetic field source 16 poles and the inductor poles of the pivoting magnet-inductor housing 14 are appropriately oriented for electrical induction to occur. All of the electromagnetic induction components in this generator are located on the rotating portion of the machine and are contained in the pivoting inductor assembly 38. There are no stationary magnetic or induction components.

The amount of electromagnetic induction created in an appropriately designed generator is determined by the magnetic field source 16 field strength or magnetic flux lines present, the inductor size and configuration, and by the proper relative angle and speed or rate of magnetic interaction between the magnetic field source 16 and inductor. Relative motion between the magnetic field source 16 and the inductor, which is part of the pivoting magnet-inductor housing 14, is necessary or there is no electrical induction created.

Centripetal or "center seeking" acceleration toward the center of circular motion is experienced by a body or mass rotating around a center point. The center seeking acceleration is necessary to keep the mass in circular motion. In this generator, the surface contact force or friction provided by the internal wall of a pivoting magnet-inductor housing 14 maintains the circular motion of the magnetic field source 16 around the input shaft 10 which is the center point of rotation. Without this internal wall restraint, the magnetic field source 16 would leave the circular motion path in a tangential direction.

Figure 4:
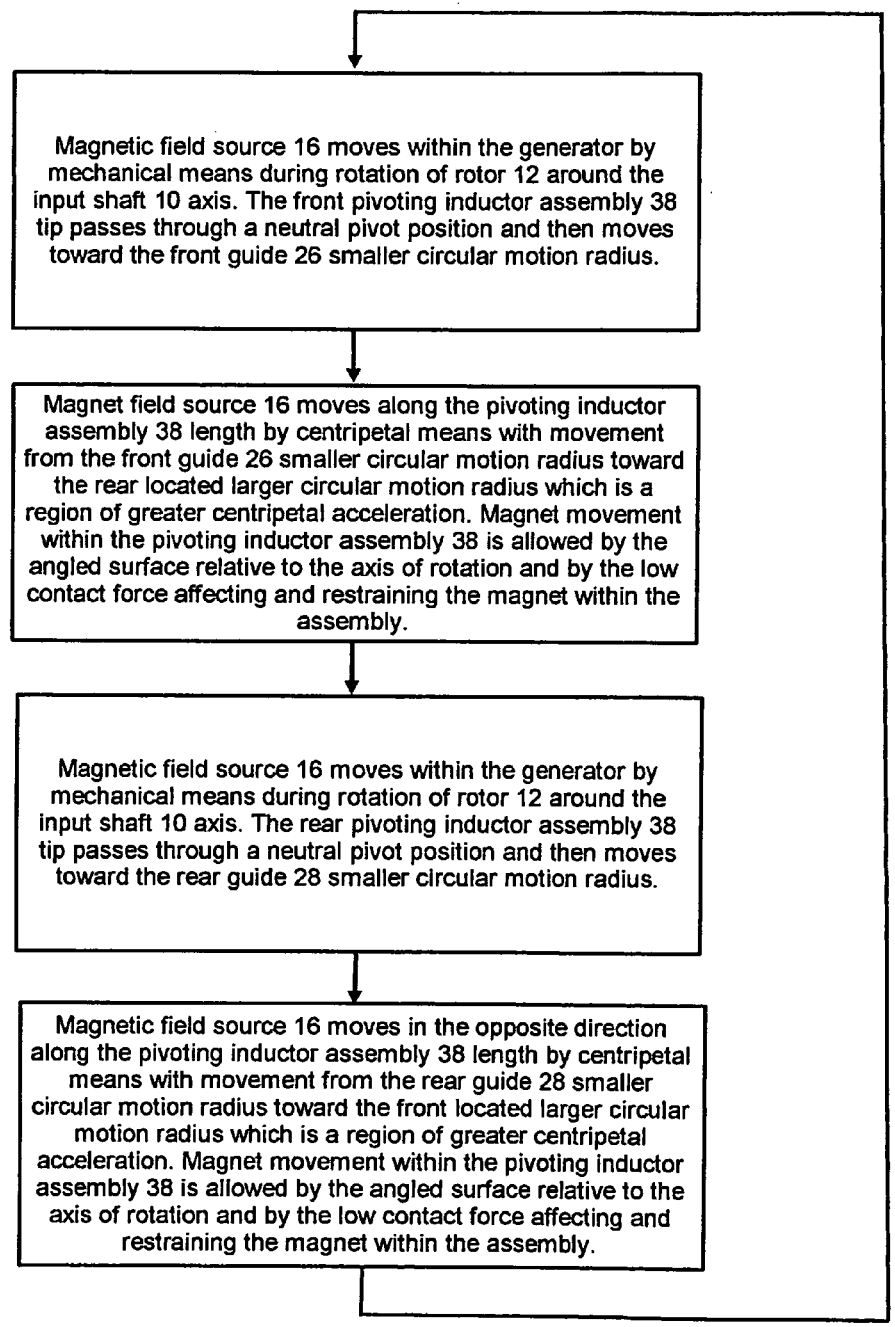
FIG. 4 is a block diagram view of an apparatus describing individual magnet movement and the associated induction process during a complete cycle of input shaft and rotor rotation.

The pivoting magnet-inductor housing 14 in this generator provides a movable contact surface to allow a change in location of a magnetic field source 16 that is in circular motion around the center of rotation. The magnetic field source 16 movement within the pivoting magnet-inductor housing 14 is from a smaller circular motion reference circle radius at one end to a larger circular motion radius which is at the other end of the housing. The magnetic field source 16 motion during induction and the associated reference circle positions are shown in FIG. 2 and FIG. 3. The magnetic field source 16 movement within the pivoting inductor assembly 38 and the electrical induction within the apparatus during a complete cycle are described in block diagram form in FIG. 4.

Guides within the generator main housing 20 cause pivoting of the pivoting magnet-inductor housing 14 during rotation to create alternating contact surface angle changes relative to the axis of the input shaft 10. A longer pivoting magnet-inductor housing 14 length that is relative to the length and travel distance of the magnetic field source 16, and is also relative to the length of the inductor portion of the pivoting inductor assembly 38, will provide more leverage at the pivoting mounting point on the rotor 12.

Figure 5:
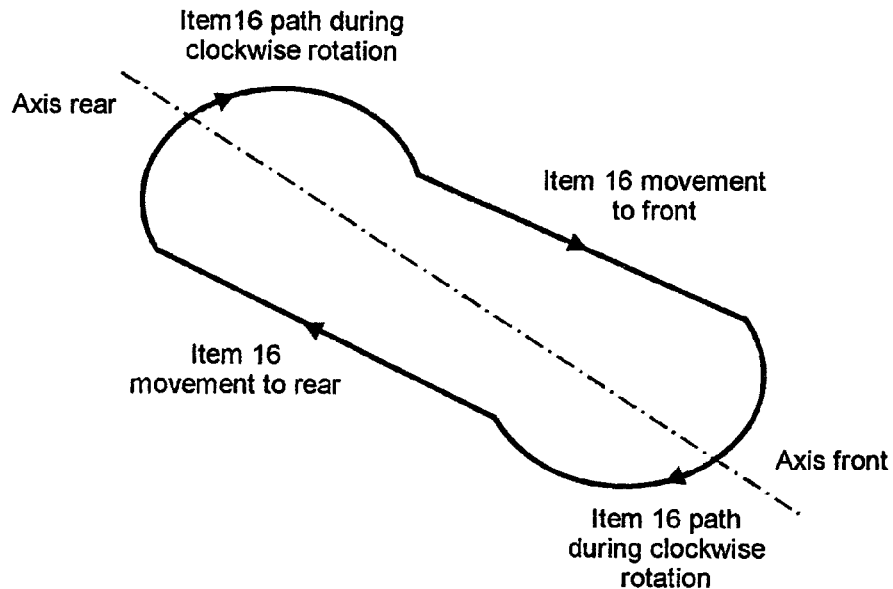
FIG. 5 is a diagram view of a generator describing the path for individual magnet movement within the apparatus during one rotation of the input shaft.

Electromagnetic induction is created when low contact force friction of the internal wall in the housing and an angled surface position provided by articulation from the guides allows a magnetic field source 16 to move away from the smaller reference circle position to a larger reference circle position at the other end of the housing. The magnetic field source 16 passes through an inductor section which is part of the pivoting magnet-inductor housing 14 to create electricity. The larger reference circle position is a region of greater centripetal acceleration toward the center of rotation. The guides provide the necessary movement of the inductor tip toward a smaller reference circular radius which is nearer the input shaft 10 axis as shown in FIG. 5. The magnetic field source 16 is positioned at the appropriate pivoting inductor assembly 38 tip at the proper time due to previous circular motion. The rotation of the input shaft 10 provides the necessary energy input to move the mass of the rotating assemblies, including the magnetic flux sources, toward the smaller reference circle radius in addition to overcoming any friction and air resistance that may be present within the apparatus.

The magnetic field source 16 attempts to remain in the larger reference circular radius by alternately moving between the front guide 26 larger circle path and the rear guide 28 larger circle path. This magnetic field source 16 motion is achieved while still remaining within an individual pivoting magnet-inductor housing 14. The magnetic field source 16 is held in rotation around the center point along the new larger radius by the pivoting magnet-inductor housing 14 tip and the end cap 18 of the opposite housing end which is following the larger reference circle path. The magnetic field source 16 follows three different simultaneously combined and coordinated motion paths during the induction process which include rotary, reciprocal, and pivoting motions.

Figure 6:
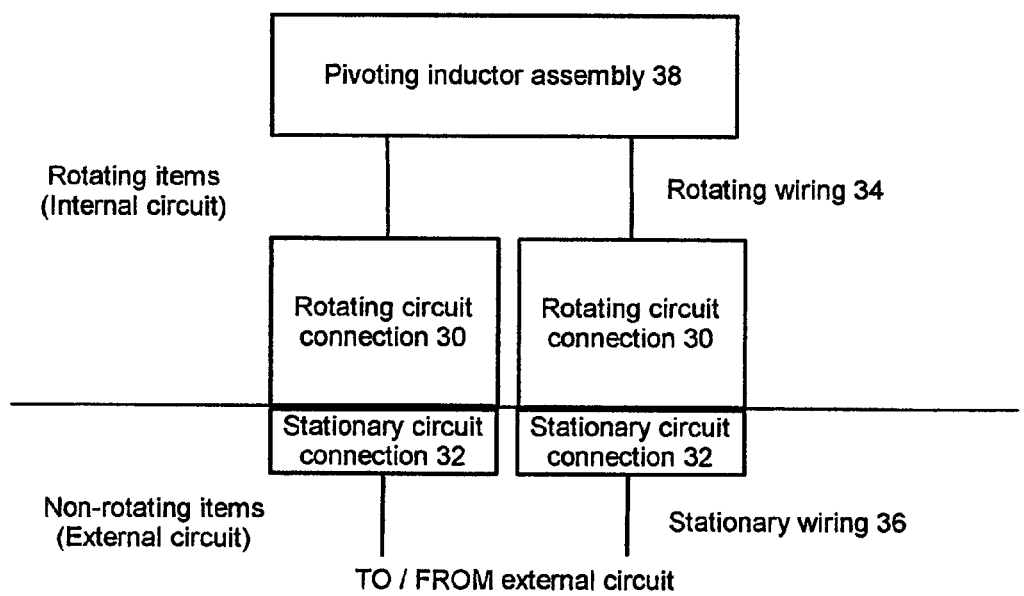
FIG. 6 is a diagram view of an apparatus describing the electrical relationship between the rotating and non-rotating elements along with the electrical path created for an individual inductor circuit.

A rotor 12 contained electrical circuit is connected to an external circuit by using rotating circuit connection 30 and stationary circuit connection 32. The electrical circuit components are divided between rotating and non-rotating portions of this machine and are described in FIG. 6. This generator is designed to reduce the prime mover effort necessary to rotate the input shaft 10 during electromagnetic induction by removing rotor 12 and stationary component magnetic interaction.

Alternating current or AC is induced in the rotating inductor. The alternating current can be used as AC or it can be changed to pulsating direct current or DC as required. The design shown in FIG. 1 has three pivoting inductor assemblies that are located 120 degrees apart around the rotor 12 circumference. This inductor arrangement creates three individual circuits that may be connected as three phase power. Other configurations such as a single phase power are possible depending on circuit design and inductor connection.

This generator creates electrical induction with input shaft 10 rotation in either clockwise or counter-clockwise motion. Increased input shaft 10 rotation speed creates greater electromagnetic induction by producing a faster rate of magnetic field source 16 and inductor interaction. The physical size and orientation, electrical capacity, magnetic field source 16 type and field strength, guide arrangement, direction of rotation, rotor 12 configuration, and the speed of rotor 12 movement are among design variables available for this generator.

Alternative Embodiments

Figure 7:
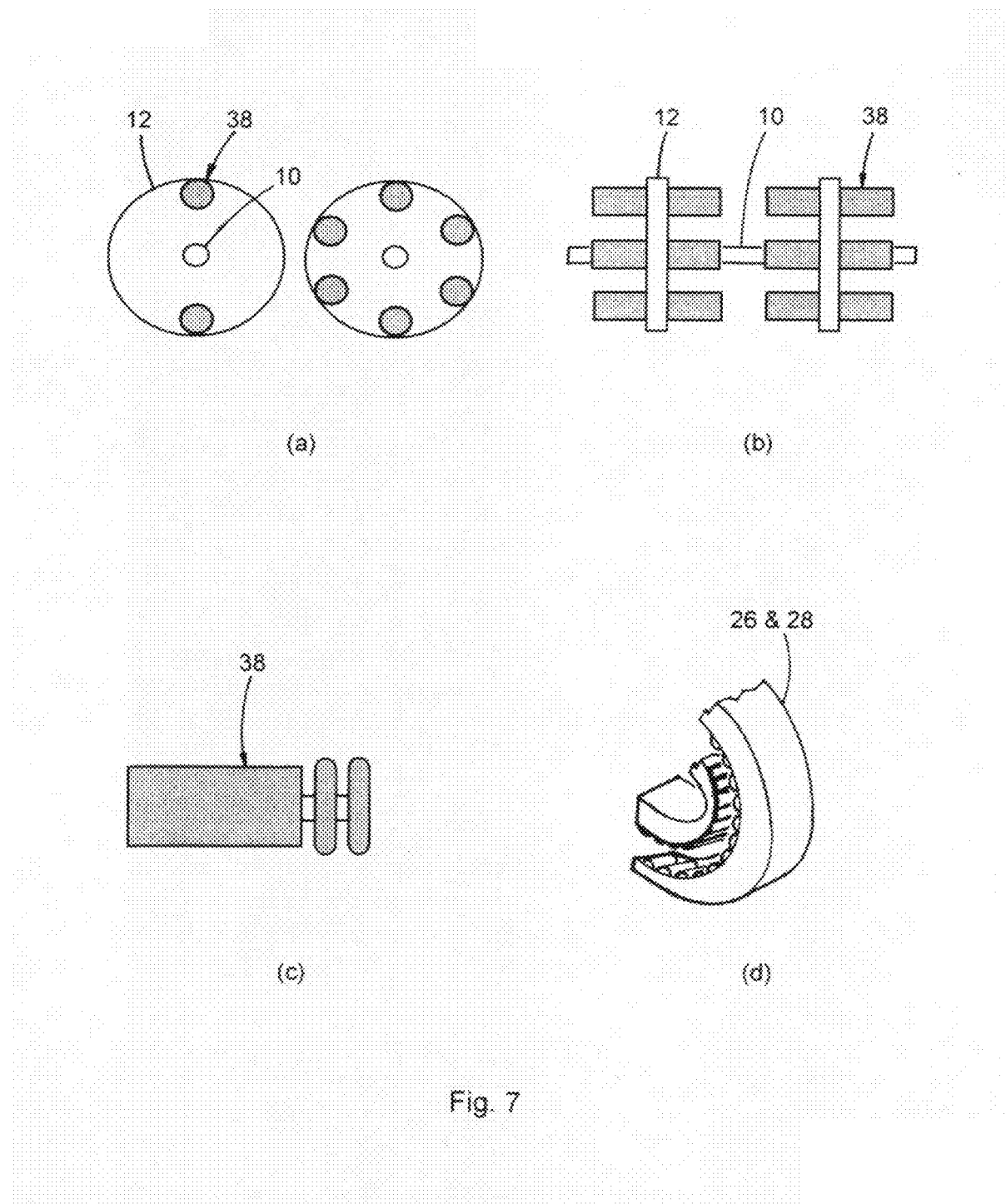
FIG. 7 is a various views view of an alternative embodiments for the generator.

The Electric Generator with Rotating Induction Apparatus and Centripetal Motion Operation presented in this document has alternative methods of embodiment as described in this section and as shown in FIG. 7. The rotor 12 may have more or fewer pivoting inductor assembly 38 attached as shown in FIG. 7(a). There may be more than one rotor 12 mounted on a common input shaft 10 with the associated guides and the appropriate rotating and non-rotating electrical circuits as shown on FIG. 7(b). A pivoting inductor assembly 38 may have rollers or other rotating mechanisms connected to the assembly. These rollers may be designed to rotate in the appropriate directions at the appropriate times to reduce friction during operation within the articulation groove of the front guide 26 or the rear guide 28 as shown in FIG. 7(c). The front guide 26 and the rear guide 28 may have roller mechanisms mounted within the inductor tip articulation grooves to reduce friction as shown in FIG. 7(d). The pivoting inductor assembly 38 articulation front guide 26 and the rear guide 28 may be combined into one element. The end cap 18 may be made of appropriate material to reduce wear and to allow for smooth and quiet operation. The pivoting magnet-inductor housing 14 may have integral magnetic field source 16 containment features designed as part of the structure. The apparatus may have a cooling method incorporated such as a fan and/or cooling openings. The pivoting inductor assembly 38 angle, relative to the rotor 12, may be varied by an appropriate mechanism determined by input shaft 10 speed. More relative angle may be used for lower speed operation and less relative angle used for higher speed operation.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electric generator with rotating induction apparatus and centripetal motion operation for creating electricity without rotating and stationary magnetic interaction resistance to input shaft movement for reduced motion source energy requirements, comprising:

means for rotary motion;

means for mounting a pivoting inductor assembly, securely connected to the means for rotary motion;

means for disposing an electromagnetic induction element;

means for originating a magnetic flux, slidingly contained within the means for disposing the electromagnetic induction element;

means for containing the means for originating the magnetic flux within the means for disposing the electromagnetic induction element, securely attached to the means for disposing the electromagnetic induction element;

means for housing a main structure, exteriorly located to the means for rotary motion;

means for supporting an input shaft front location, securely connected to the means for housing the main structure;

means for supporting an input shaft rear location, securely connected to the means for housing the main structure;

means for articulating a front tip of the pivoting inductor assembly, securely positioned to the means for housing the main structure;

means for articulating a rear tip of the pivoting inductor assembly, securely positioned to the means for housing the main structure;

means for providing a rotary element electrical circuit connection, securely connected to the means for rotary motion and rotatable with the means for rotary motion;

means for providing an electrical connection to non-rotating circuitry, securely attached to the means for housing the main structure and stationary at a location corresponding against the means for providing the rotary element circuit connection;

means for connecting an electrical circuit between the pivoting inductor assembly and the means for providing the rotary element electrical circuit connection, electrically connected to the means for providing the rotary element electrical circuit connection;

means for connecting an electrical circuitry from the means for providing the electrical connection to non-rotating circuitry to external circuitry, electrically connected to the means for providing the electrical connection to non-rotating circuitry; and means for electromagnetic induction utilizing magnetic field source and inductor interaction with relative movement by centripetal motion, electrically connected to the means for connecting the electrical circuitry between the pivoting inductor assembly and the means for providing the rotary element electrical circuit connection, the means for electromagnetic induction utilizing magnetic field source and inductor interaction with relative movement by centripetal motion constructed to the means for disposing the electromagnetic induction element, and pivotally attached to the means for mounting the pivoting inductor assembly.

2. The electric generator with rotating induction apparatus and centripetal motion operation in accordance with claim 1, wherein the means for rotary motion comprises an input shaft.

3. The electric generator with rotating induction apparatus and centripetal motion operation in accordance with claim 1, wherein the means for mounting the pivoting inductor assembly comprises a rotor.

4. The electric generator with rotating induction apparatus and centripetal motion operation in accordance with claim 1, wherein the means for disposing the electromagnetic induction element comprises a non-magnetic material pivoting magnet-inductor housing.

5. The electric generator with rotating induction apparatus and centripetal motion operation in accordance with claim 1, wherein the means for originating the magnetic flux comprises a magnetic field source.

6. The electric generator with rotating induction apparatus and centripetal motion operation in accordance with claim 4, wherein the means for containing the means for originating the magnetic flux within the pivoting magnet-inductor housing comprises a non-magnetic material end cap.

7. The electric generator with rotating induction apparatus and centripetal motion operation in accordance with claim 1, wherein the means for housing the main structure comprises a main housing.

8. The electric generator with rotating induction apparatus and centripetal motion operation in accordance with claim 1, wherein the means for supporting the input shaft front location comprises a front input shaft support.

9. The electric generator with rotating induction apparatus and centripetal motion operation in accordance with claim 1, wherein the means for supporting the input shaft rear location comprises a rear input shaft support.

10. The electric generator with rotating induction apparatus and centripetal motion operation in accordance with claim 1, wherein the means for articulating the front tip of the pivoting inductor assembly comprises a front guide.

11. The electric generator with rotating induction apparatus and centripetal motion operation in accordance with claim 1, wherein the means for articulating the rear tip of the pivoting inductor assembly comprises a rear guide.

12. The electric generator with rotating induction apparatus and centripetal motion operation in accordance with claim 1, wherein the means for providing the rotary element electrical circuit comprises a rotating circuit connection.

13. The electric generator with rotating induction apparatus and centripetal motion operation in accordance with claim 1, wherein the means for providing the electrical connection to non-rotating circuitry comprises a stationary circuit connection.

14. The electric generator with rotating induction apparatus and centripetal motion operation in accordance with claim 1, wherein the means for connecting the electrical circuit between the pivoting inductor assembly and the means for providing the rotary element electrical circuit comprises a rotating wiring.

15. The electric generator with rotating induction apparatus and centripetal motion operation in accordance with claim 1, wherein the means for connecting the electrical circuitry from the means for providing the electrical connection to non-rotating circuitry to external circuitry comprises a stationary wiring.

16. The electric generator with rotating induction apparatus and centripetal motion operation in accordance with claim 1, wherein the means for electromagnetic induction utilizing magnetic field source and inductor interaction with relative movement by centripetal motion comprises a pivoting inductor assembly.

17. An electric generator with rotating induction apparatus and centripetal motion operation for creating electricity without rotating and stationary magnetic interaction resistance to input shaft movement for reduced motion source energy requirements, comprising:
an input shaft, for rotary motion;
a rotor, for pivoting inductor assembly mounting, securely connected to said input shaft;
a non-magnetic material pivoting magnet-inductor housing, for disposing an electromagnetic induction element;
a magnetic field source, for magnetic flux origination, slidingly contained within said pivoting magnet-inductor housing;
a non-magnetic material end cap, for magnet containment within the pivoting magnet-inductor housing, securely attached to said pivoting magnet-inductor housing;
a main housing, for main structure creation, exteriorly located to said input shaft;
a front input shaft support, for input shaft front location and support, securely connected to said main housing;
a rear input shaft support, for input shaft rear location and support, securely connected to said main housing;
a front guide, for pivoting inductor assembly front tip articulation, securely positioned to said main housing;
a rear guide, for pivoting inductor assembly rear tip articulation, securely positioned to said main housing;
a rotating circuit connection, for rotary element electrical circuit connection, securely connected to said input shaft and rotatable with said input shaft;
a stationary circuit connection, for electrical connection to non-rotating circuitry, securely attached to said main housing at a location corresponding against the rotating circuit connection;
a rotating wiring, for electrical circuit between a pivoting inductor assembly and the rotating circuit connection, the rotating wiring located on the rotor and electrically connected to said rotating circuit connection;
a stationary wiring, for electrical circuitry from the stationary circuit connection to external circuitry, electrically connected to said stationary circuit connection; and
the pivoting inductor assembly, for electromagnetic induction utilizing magnetic field source and inductor interaction with relative movement by centripetal motion, electrically connected to said rotating wiring, the pivoting inductor assembly constructed to said pivoting magnet-inductor housing, and pivotally attached to said rotor;
wherein the relative movement of the magnetic field source induces an electric current that is transferred from the pivoting inductor assembly via rotating wiring to the rotating circuit connection, from the rotating circuit connection to the stationary circuit connection, from the stationary circuit connection to the stationary wiring, and from the stationary wiring to the external circuitry.

18. The electric generator with rotating induction apparatus and centripetal motion operation as recited in claim 17, wherein said magnetic field source is magnetic field material of any type.

* * * * *